(12) United States Patent
Lin

(10) Patent No.: US 7,530,291 B2
(45) Date of Patent: May 12, 2009

(54) CRANK DEVICE FOR BICYCLE

(76) Inventor: Chang Hui Lin, No. 13, Ju Wei Lane, Gin Lin Tsuen, Siu Shui Hsiang, Chang Hua Hsien 50446 (TW)

( * ) Notice: Subject to any disclaimer, the term of this patent is extended or adjusted under 35 U.S.C. 154(b) by 376 days.

(21) Appl. No.: 11/485,670

(22) Filed: Jul. 13, 2006

(65) Prior Publication Data

US 2008/0011120 A1    Jan. 17, 2008

(51) Int. Cl.
  *G05G 1/14*    (2006.01)
(52) U.S. Cl. ..................... 74/594.1; 74/594.2
(58) Field of Classification Search ..... 74/594.1–594.4, 74/579 R–580; D12/123; *B62M 3/00; G05G 1/14*
  See application file for complete search history.

(56) References Cited

U.S. PATENT DOCUMENTS

| 3,648,542 | A | * | 3/1972 | Perotti et al. ............... | 74/594.1 |
| 5,010,785 | A | * | 4/1991 | Romero ..................... | 74/594.1 |
| 5,062,318 | A |   | 11/1991 | Yamazaki .................. | 74/594.2 |
| 5,623,856 | A | * | 4/1997 | Durham ..................... | 74/594.1 |
| D384,603 | S | * | 10/1997 | Chen ......................... | D12/123 |
| 7,360,470 | B2 | * | 4/2008 | Bonner ...................... | 74/594.1 |
| 2001/0049976 | A1 | * | 12/2001 | Dodman .................... | 74/594.1 |
| 2005/0217417 | A1 | * | 10/2005 | Uchida et al. ............. | 74/594.1 |

FOREIGN PATENT DOCUMENTS

| EP | 1 350 714 A1 | * | 10/2003 |
| EP | 1 419 961 A1 | * | 5/2004 |
| EP | 1 378 433 A1 | * | 1/2009 |

* cited by examiner

*Primary Examiner*—Vinh T. Luong
(74) *Attorney, Agent, or Firm*—Charles E. Baxley

(57) ABSTRACT

A crank device includes a crank arm having an opening formed in one end and defined by an outer peripheral fence for attaching to a crank shaft, and an orifice formed in another end and defined by an outer peripheral wall for coupling to a foot pedal, and the crank arm includes one or more apertures formed in the other end and formed in the outer peripheral wall for weight reducing purposes. The aperture may be laterally formed in the other end of the crank arm, or formed through the outer peripheral wall of the crank arm and communicating with the orifice of the crank arm. The crank arm may further include one or more depressions for further weight reducing purposes.

1 Claim, 6 Drawing Sheets

CRANK DEVICE FOR BICYCLE

BACKGROUND OF THE INVENTION

1. Field of the Invention

The present invention relates to a crank device, and more particularly to a crank device including a weight reducing structure for reducing the weight of the crank device without decreasing the strength of the crank device.

2. Description of the Prior Art

Typical crank devices comprise one end for securing to a crank shaft and/or a chain wheel of a gear shifting device, and another end for coupling a foot pedal.

For example, U.S. Pat. No. 5,062,318 to Yamazaki discloses one of the typical crank devices that is normally made of molding or mold injection processes, or by die casting processes, or the like, and that also includes one end for securing to a crank shaft and/or a chain wheel of a gear shifting device, and another end for coupling a foot pedal.

However, the molded or die cast typical crank devices include a solid or integral structure made of heavy metal materials and having a great weight, and having no weight reducing structure formed or provided therein such that the weight of the crank device is great or heavy.

The present invention has arisen to mitigate and/or obviate the afore-described disadvantages of the conventional structures of the crank devices.

SUMMARY OF THE INVENTION

The primary objective of the present invention is to provide a crank device including a weight reducing structure for reducing the weight of the crank device without decreasing the strength of the crank device.

In accordance with one aspect of the invention, there is provided a crank device comprising a crank arm including an opening formed in a first end thereof and defined by an outer peripheral fence for attaching to such as a crank shaft, and including an orifice formed in a second end thereof and defined by an outer peripheral wall for coupling to such as a foot pedal, and the crank arm includes at least one aperture formed in the second end thereof and formed in the outer peripheral wall for weight reducing purposes.

The aperture is laterally formed in the second end of the crank arm. For example, the aperture is formed through the outer peripheral wall at the second end of the crank arm and communicating with the orifice of the crank arm.

The crank arm includes at least one depression formed therein for weight reducing purposes. For example, the depression of the crank arm may be formed in an upper portion of the crank arm, or in a lower portion of the crank arm, or in a side portion of the crank arm.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
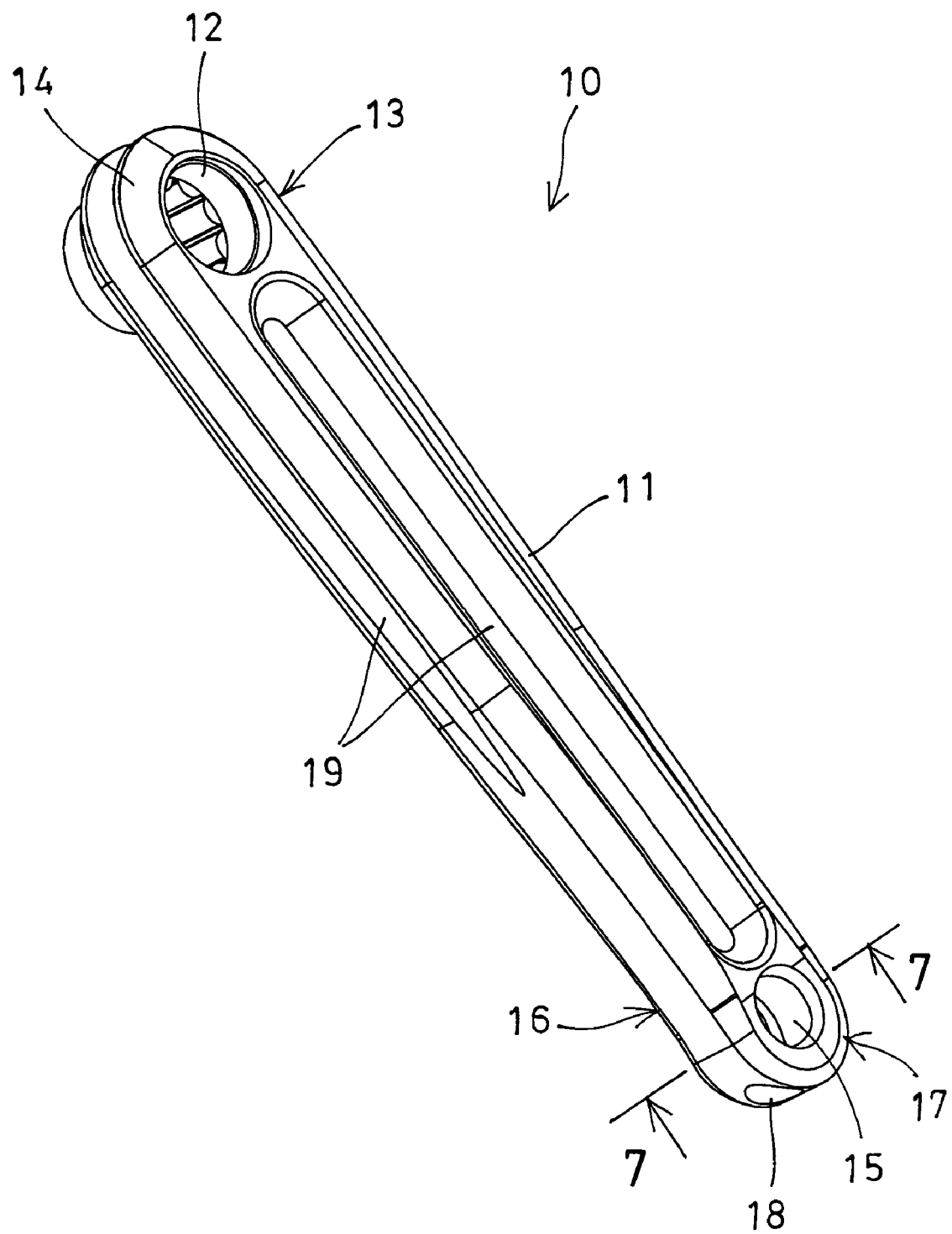
FIG. 1 is a perspective view of a crank device in accordance with the present invention as seen from one direction.
Figure 3:
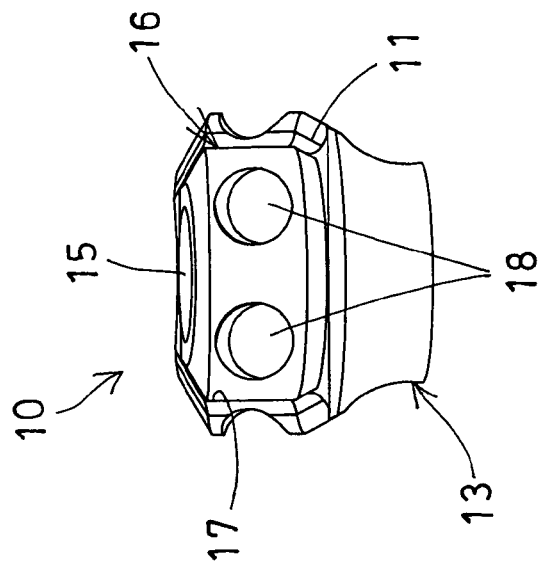
FIG. 3 is a front end elevational view of the crank device.
Figure 2:
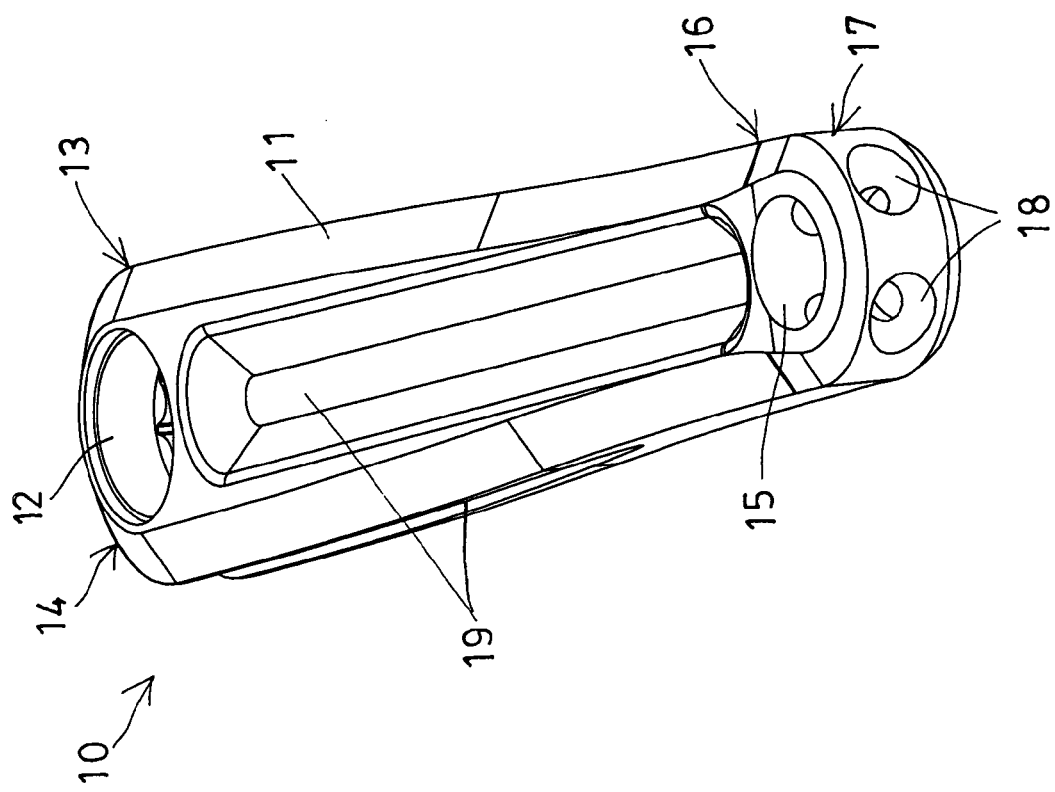
FIG. 2 is a perspective view of the crank device as seen from the other direction.
Figure 4:
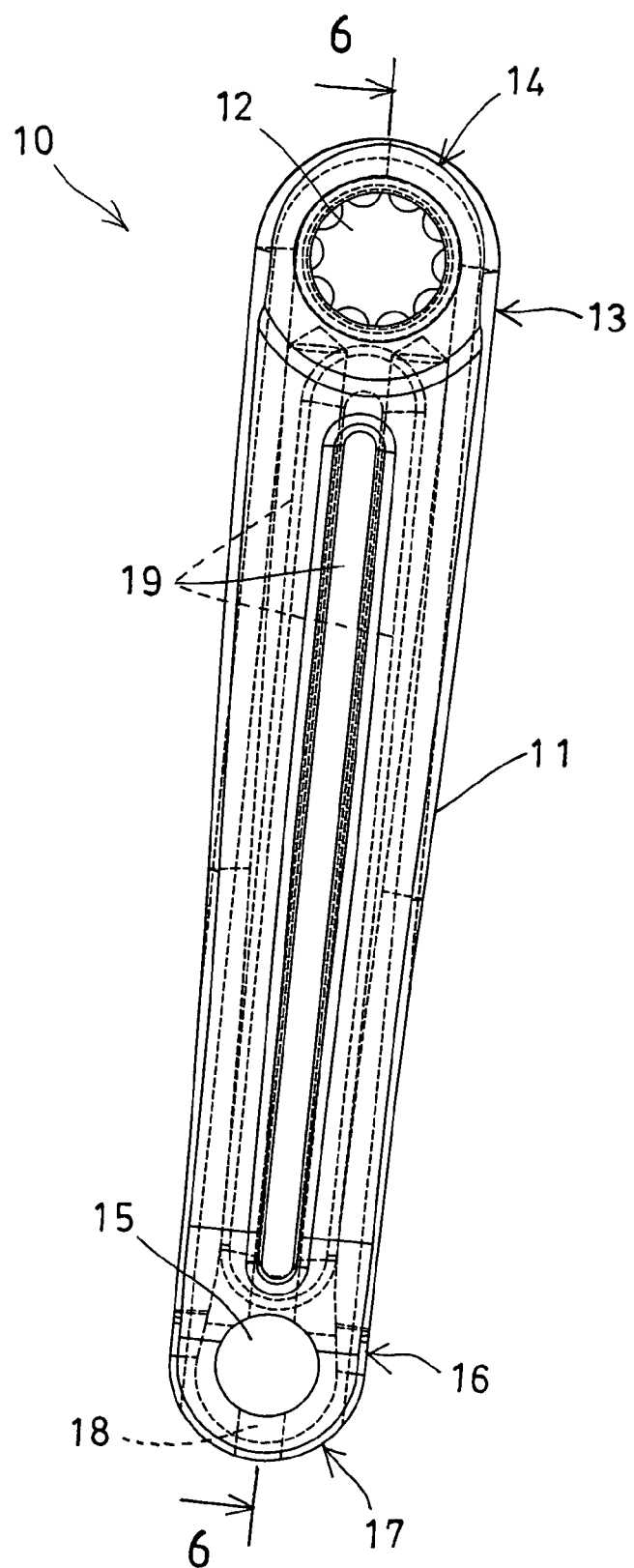
FIG. 4 is a top plan view of the crank device.
Figure 5:
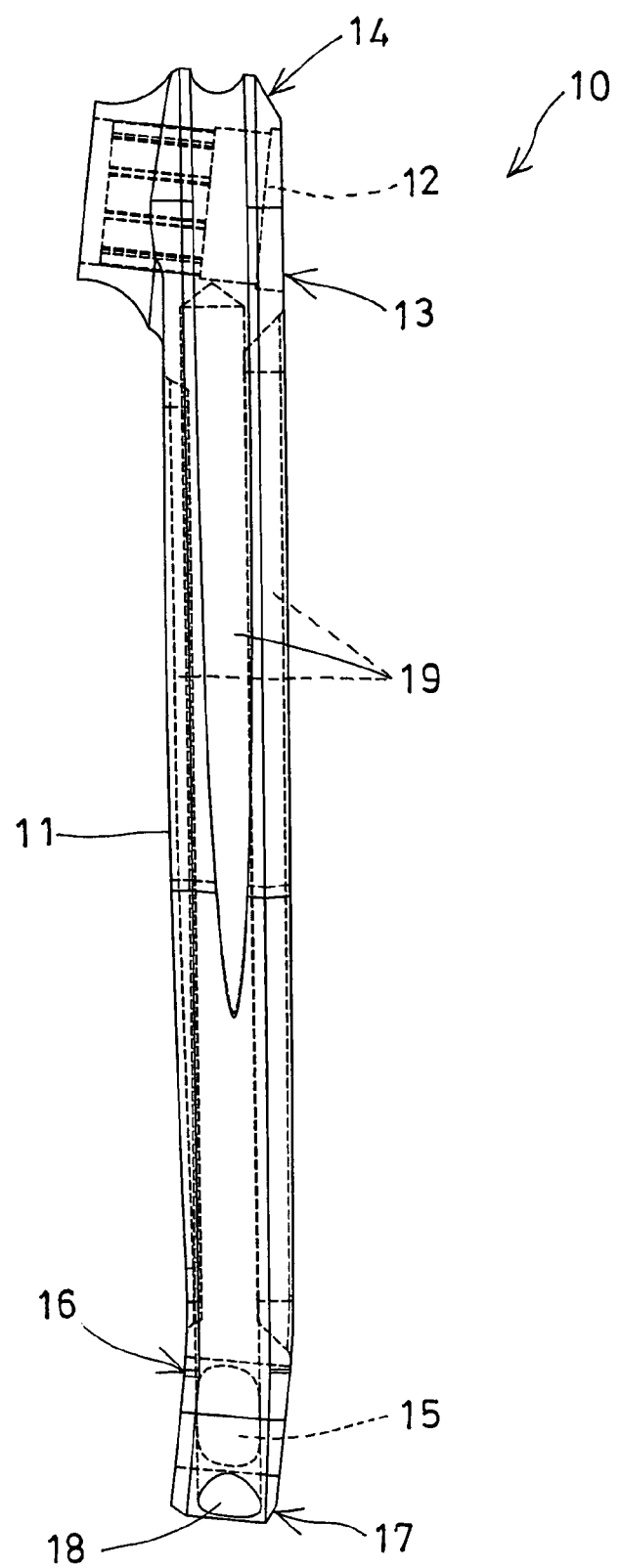
FIG. 5 is a side plan view of the crank device.
Figure 6:
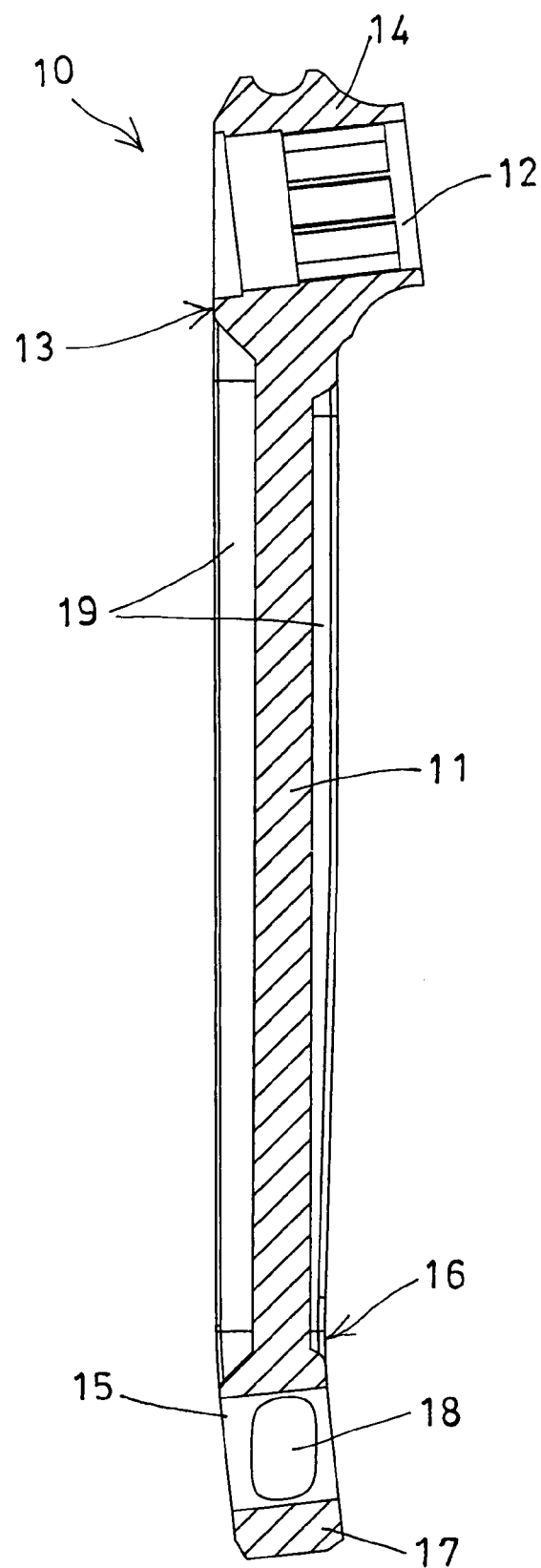
FIG. 6 is a cross sectional view of the crank device taken along lines 6-6 of FIG. 4.
Figure 7:
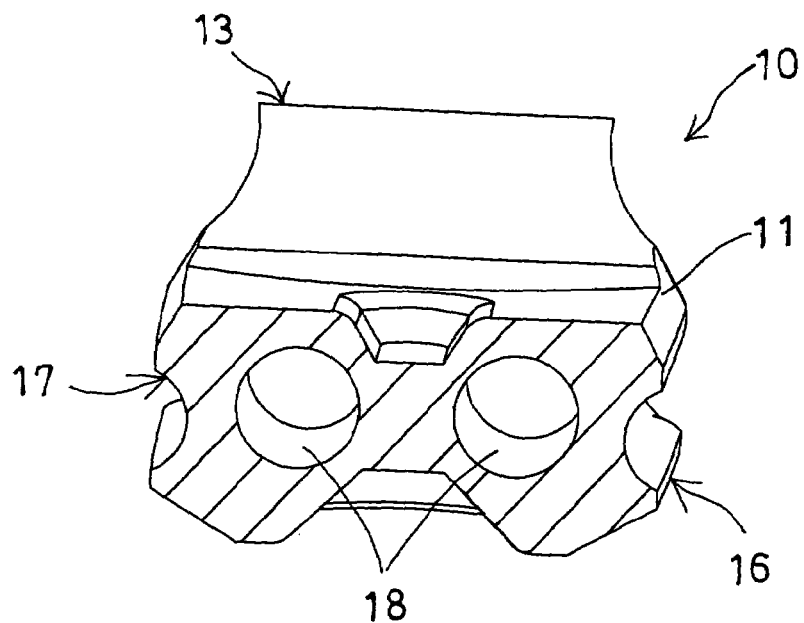
FIG. 7 is a cross sectional view of the crank device taken along lines 7-7 of FIG. 1.

Referring to the drawings, and initially to FIGS. 1-7, a crank device 10 in accordance with the present invention comprises a crank body or crank arm 11 including an opening 12 formed in one end 13 thereof and defined by an outer peripheral fence 14 for attaching or engaging or securing to a crank shaft and/or a chain wheel of a gear shifting device of a bicycle (not shown), and including an orifice 15 formed in the other end 16 thereof and defined by an outer peripheral wall 17 for attaching or engaging or securing or coupling to a foot pedal (not shown).

Figure 8:
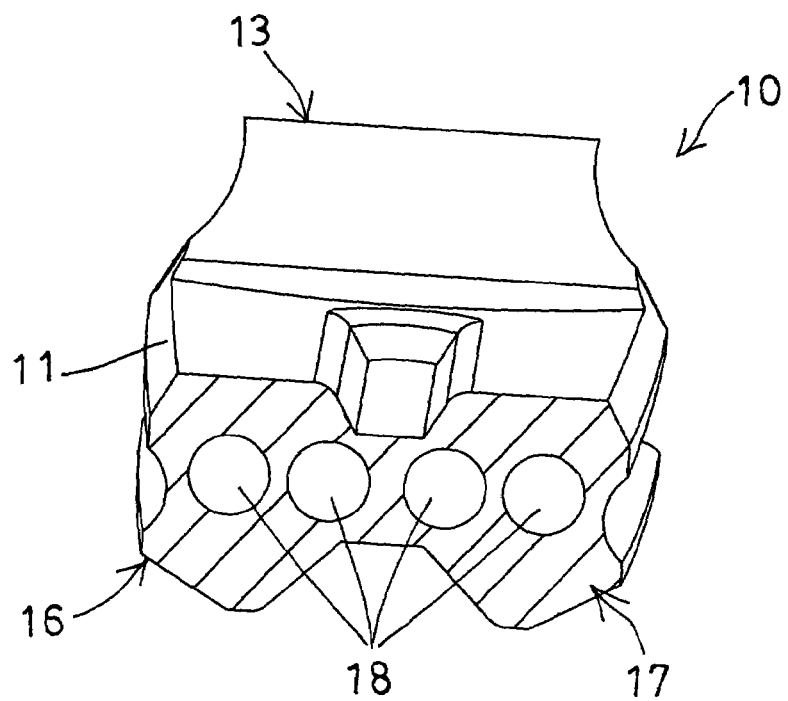
FIG. 8 is a cross sectional view similar to FIG. 7, illustrating the other arrangement of the crank device.

The crank arm 11 further includes one or more apertures 18 laterally formed in the other end 16 thereof (FIGS. 7, 8) and preferably formed through the peripheral wall 17 and communicating with the orifice 15 of the crank arm 11 for suitably reducing the weight of the crank arm 11 of the crank device 10. It is to be noted that the other end 16 of the crank arm 11 is provided for attaching or securing or coupling to the foot pedal and will not be suffered with great forces or torques such that the provision or the formation of the apertures 18 in the other end 16 of the crank arm 11 of the crank device 10 will not decrease or reduce the strength of the crank arm 11 of the crank device 10, but may suitably reduce or decrease the weight of the crank arm 11 of the crank device 10.

The crank arm 11 may further include one or more notches or depressions 19 formed in the upper portion and/or the lower portion and/or the side portions thereof for further suitably reducing the weight of the crank arm 11 of the crank device 10 without decreasing or reducing the strength of the crank arm 11 of the crank device 10.

Accordingly, the crank device in accordance with the present invention includes a weight reducing structure for reducing the weight of the crank device without decreasing the strength of the crank device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A crank device comprising:

a crank arm including an opening formed in a first end thereof and defined by an outer peripheral fence for attaching to a crank shaft, and including an orifice formed in a second end thereof and defined by an outer peripheral wall for coupling to a foot pedal, and said crank arm including at least one aperture laterally formed in said second end thereof and formed in said outer peripheral wall and formed through said outer peripheral wall at said second end of said crank arm and communicating with said orifice of said crank arm, and said crank arm including at least one longitudinal depression formed in an upper portion of said crank arm and including at least one longitudinal depression formed in a lower portion of said crank arm and including at least one longitudinal depression formed in a side portion of said crank arm for weight reducing purposes.

* * * * *